United States Patent [19]

Scherenberg et al.

[11] 4,242,990
[45] Jan. 6, 1981

[54] SPARK IGNITED INTERNAL COMBUSTION ENGINE

[75] Inventors: Dieter Scherenberg; Walter Benedikt, both of Stuttgart, Fed. Rep. of Germany

[73] Assignee: Robert Bosch GmbH, Stuttgart, Fed. Rep. of Germany

[21] Appl. No.: 946,462

[22] Filed: Sep. 27, 1978

[30] Foreign Application Priority Data

Oct. 15, 1977 [DE] Fed. Rep. of Germany ....... 2746596

[51] Int. Cl.³ .................... F02B 15/02; F02B 23/00
[52] U.S. Cl. ............................ 123/263; 123/169 PA; 123/280; 123/286
[58] Field of Search ............. 123/32 C, 32 SP, 32 ST, 123/30 D, 169 PA, 169 P, 191 S, 191 SP; 313/143 A

[56] References Cited

U.S. PATENT DOCUMENTS

| 1,325,405 | 12/1919 | Jouffret | 123/169 PA |
| 3,102,521 | 9/1963 | Slemmons | 123/32 SP |
| 3,814,067 | 6/1974 | Fuente | 123/32 SP |

FOREIGN PATENT DOCUMENTS

| 173901 | 7/1952 | Fed. Rep. of Germany | 123/32 C |
| 2655352 | 6/1978 | Fed. Rep. of Germany | 313/143 |
| 297966 | 6/1932 | Italy | 123/32 C |

Primary Examiner—Charles J. Myhre
Assistant Examiner—Craig R. Feinberg
Attorney, Agent, or Firm—Edwin E. Greigg

[57] ABSTRACT

The invention is in an externally ignited internal combustion engine which has one main combustion chamber per cylinder and one ignition chamber which communicates with the main combustion chamber via an excess flow channel, the opening member of which projects into the main combustion chamber and is embodied as a flame injector. After the ignition of the mixture located in the ignition chamber by means of a spark plug, when the jet of flame leaves the excess flow channel and enters the main combustion chamber through the flame injector, the fuel-rich mixture surrounding the opening of the ignition chamber is induced in the vicinity of the cooled walls of the main combustion chamber and thus the temperature of the jet of flame is lowered. In this way, the $NO_x$ concentration of the charge component comprising the jet of flame, and thus also the exhaust gas quantity as a whole, is reduced. At the same time, the turbulence of the charge in the main combustion chamber is rapidly increased at the instant of combustion, thus producing a much more desirable firing action.

10 Claims, 1 Drawing Figure

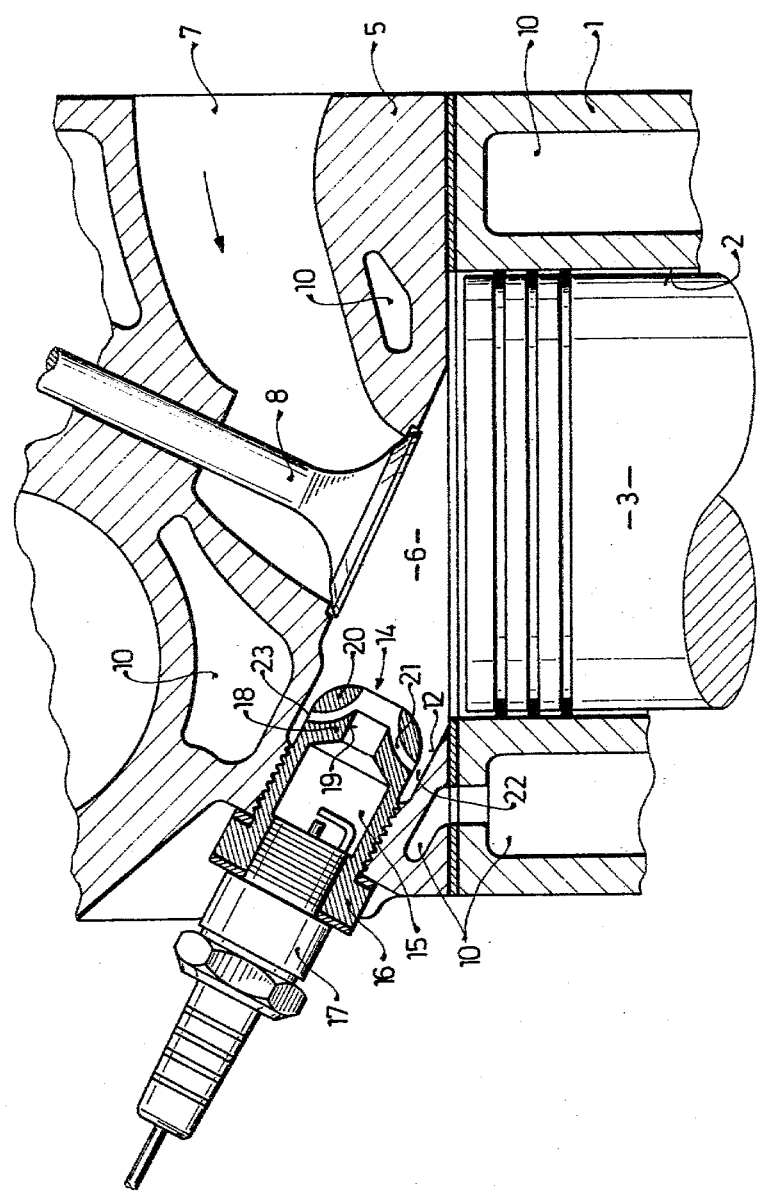

SPARK IGNITED INTERNAL COMBUSTION ENGINE

BACKGROUND OF THE INVENTION

The invention relates to internal combustion engines of the type which require a spark plug. Such a known internal combustion engine, which has a main combustion chamber for each cylinder and an ignition chamber communicating therewith, has the disadvantage that the firing charge located in the ignition chamber, which after ignition exits as a jet of flame into the main combustion chamber, is the most highly heated zone, and in the course of the further compression which it undergoes, it is heated still further, when the remainder of the charge is consumed in the main combustion chamber. In a known manner, the formation of $NO_x$ is particularly apparent in the charge components which are highly heated. The larger the charge quantity and the higher the temperature, the higher will be the emission of $NO_x$ in the consumed charge as a whole.

OBJECT AND SUMMARY OF THE INVENTION

The arrangement according to the invention has the advantage that by means of the induction of cool charge components of the main combustion chamber and the early mixing of these charge components with the hot jet of flame, the temperature of this jet of flame is lowered early and thus the $NO_x$ concentration is reduced.

By use of this device, it is predominantly the hydrocarbon-rich mixture of the charge that is located in the vicinity of the cooled combustion chamber walls which is induced in the main combustion chamber and as a consequence a further reduction in $NO_x$ emissions is produced, since the hydrocarbons in the absence of oxygen have a reducing effect on $NO_x$ components which have already been formed.

The invention will be better understood as well as further objects and advantages thereof become more apparent from the ensuing detailed description of a preferred embodiment taken in conjunction with the drawing.

BRIEF DESCRIPTION OF THE DRAWING

The single FIGURE of the drawing generally shows a cross-sectional view of an exemplary embodiment of the invention.

DESCRIPTION OF THE PREFERRED EMBODIMENT

Turning now to the drawing, there is shown a fragmentary cross-sectional view through a cylinder of an internal combustion engine. In the cylinder block 1 there are cylinder bores 2, of which a part of the cylinder bore is shown in an enlarged cutaway view. There is a piston 3 arranged in the cylinder bore 2 which is slidable therein in a known manner and which, together with a cylinder head 5 that forms the closure for the cylinder bore 2, encloses a main combustion chamber 6. The main combustion chamber is supplied with the fuel mixture via an induction line 7. The entrance of the fresh charge from the induction line 7 into the main combustion chamber 6 is controlled by an inlet valve 8. In the conventional manner the parts of the cylinder head 5 and cylinder block 1 which are attached to the main combustion chamber 6 and to the cylinder bore 2 undergo cooling, which in the present case takes place by means of hollow spaces 10 filled with a cooling fluid.

The main combustion chamber 6, which is not essentially subdivided, has a cylindrical wall 12, which is immediately surrounded by the water-filled hollow spaces 10 and into which the threaded orifice-like body 14 having seriatim protrusive lip portions of an ignition chamber 15 projects. The ignition chamber 15 has a rotary-symmetrical shape and is disposed in an insert 16 which is tightly threaded into the cylinder head 5. A spark plug 17 is arranged to be threaded into the insert 16 in alignment with the axis of the ignition chamber 15. The other end of the insert 16 has an internal jet-like part 18, generally simulating pursed lips, which includes an annular excess flow channel 19 that extends coaxially with the axis of the spark plug 17 into the main combustion chamber 6. The jet-like part 18 is surrounded on the combustion chamber side by a contiguous portion 20 which is firmly connected with the insert 16. The contiguous portion 20 along with the jet-like part 18 is arranged to form an annular curvilinear channel 21, which on the one side is constricted and arranged to empty tangentially into the excess flow channel 19 formed by the jet 18 while at the same time the external wall of the insert 16 is provided with radial openings 23 thereby provides for communication with the annular gap 22.

The apparatus operates as follows:

After the main combustion chamber 6 is charged with a mixture of fuel and air during the induction stroke of the piston 3 via the induction line 7 and the opened inlet valve 8, the mixture is then compressed to the smallest remaining volume of the main combustion chamber 6 in the conventional manner after the inlet valve 8 closes when the piston 3 makes an upward stroke. During this compression operation, a portion of the charge also flows via the excess flow channel 19 into the ignition chamber 15. As soon as the mixture in the ignition chamber 15 is ignited by a spark from the spark plug 17, shortly before the piston 3 has reached its top dead center, a rapid processing of the fuel takes place with the air which is present, and the ignited mixture is forced out through the excess flow channel 19 into the main combustion chamber 6 in the form of a jet of flame. There, the remaining mixture components which were initially introduced to the combustion chamber are ignited.

To this extent, the mode of operation corresponds to that of a known ignition chamber. In a known manner, even a very lean operating mixture can be positively ignited and a uniform subsequent combustion can be accomplished with such an ignition chamber. The ignition of the very lean mixture per se is improved by the high turbulence of the mixture as it enters the ignition chamber 15, and the subsequent ignition of the remaining charge is improved in that the jet of flame as it exits from the aforesaid pursed lips 18 into the main combustion chamber 6 causes high turbulence therein and effects rapid mixing. In this way an extremely rapid firing of the entire mixture delivered thereto is also accomplished.

In the embodiment according to the invention, the annular curvilinear channel 21 opens tangentially into the jet of flame. By means of an injector effect, a part of the charge located in the annular gap 22 which surrounds the exterior wall of insert 16 and in the main combustion chamber 6 is also induced via the annular channel 21 and the openings 23 and is intensively mixed with the gases of the jet of flame. The induced mixture is a mixture which has been enriched with hydrocarbons and which is located in the vicinity of the cooled combustion chamber walls of the cylinder head 5 in the cylindrical part 12 of the main combustion chamber. The collection of fuel-rich mixture components at this point is also furthered by means of the entrance angle of the induction line 7 or the position of the ignition chamber 15.

The mixing of the hot jet of flame with the induced cooler, hydrocarbon-rich fresh charge leads to a lowering of the temperature of the jet of flame and thereby of those mixture components which contain the highest concentration of $NO_x$. The mixture which is first ignited in the vicinity of the spark plug 17 reaches a high temperature early in the operation, which is further increased through the further compression during the processing of the remaining charge components. The highly heated components of the burned fuel mixture are carriers of high $NO_x$ emissions and as a consequence the content thereof is greater, the higher is the maximal combustion temperature. By means of the additional mixing in of cooler hydrocarbon-rich mixture components with the jet of flame, the peak temperature is lowered. Further, when there is a lack of oxygen, the reducing effect of the hydrocarbons on the $NO_x$ components is exploited and thus a reduction of the nitrous oxide emission is achieved.

The jet of flame as it exits from the pursed lips 18 further causes a high amount of turbulent motion in the charge and a rapid processing of the entire operating mixture delivered thereto. As a result, in comparison with conventional spark plug arrangements in the main combustion chamber, at equal operating conditions there is a reduced consumption of fuel. If the fuel consumption is permitted to remain at the normally high level, then the employment of the apparatus according to the invention provides the option of shifting the instant of ignition closer to top dead center. This procedure again has the effect, in a known manner, of reducing the $NO_x$ and hydrocarbon emissions.

If the annular curvilinear channel 21 and gap 22 are kept very narrow, that is, smaller than 0.2 mm, then the entrance of the flame front into these zones (while the exit speed of the jet of flame is dropping) is positively avoided. In this way, the annular gap 22 in particular, as a hydrocarbon-rich, cool zone, is favored and supplementally an overheating of the forward extension of the orifice-like body 14 is avoided.

The foregoing relates to a preferred embodiment of the invention, it being understood that other embodiments and variants thereof are possible within the spirit and scope of the invention, the latter being defined by the appended claims.

What is claimed is:

1. A spark ignited internal combustion engine which has one main combustion chamber per cylinder and one ignition chamber which communicates with the main combustion chamber via an excess flow channel into which ignition chamber a spark plug having a central electrode is inserted, further wherein an orifice-like body having an exterior wall and means defining an opening to receive the spark plug, said body including said ignition chamber and said ignition chamber terminating in a flame ejector means which projects into said main combustion chamber through which the mixture located in said main combustion chamber which radially surrounds said body is induced upon the exit of the jet of flame through said flame ejector means out of said ignition chamber via induction openings in said exterior wall.

2. An internal combustion engine according to claim 1, wherein said induction openings are smaller than 0.2 mm.

3. An internal combustion engine according to claim 1, further wherein said central electrode of said spark plug is in axial alignment with said flame ejector means.

4. An internal combustion engine according to claim 1, further wherein said flame ejector means includes a forwardly tapered wall that merges into a flow channel and means spaced from said flame ejector means defining an opening axially aligned therewith, said last named means having a wall arranged to assure induced air to flow past said flame ejector means and said zone in front thereof.

5. An internal combustion engine according to claim 4, wherein said induction openings are smaller than 0.2 mm.

6. An internal combustion engine according to claim 1, further wherein said main combustion chamber includes an annular channel area into which the terminus of said orifice-like body projects and said channel area arranged to control flow of induced air toward said induction openings.

7. An internal combustion engine according to claim 6, wherein said induction openings are smaller than 0.2 mm.

8. An internal combustion engine according to claim 1 wherein said ignition chamber is defined by an inner surface of said body, said flame ejector means having an exit orifice defined by the inner surface of the body at another transverse end of the body and said induction openings having at least one channel formed in the wall of the body and opening, at one end, in an outer surface of the body, and at the other end, into the exit orifice.

9. An internal combustion engine according to claim 8 wherein said at least one channel is formed as a curvilinear channel.

10. An internal combustion engine according to claim 8 wherein said ignition chamber and said orifice-like body are formed integrally therewith.

* * * * *